United States Patent [19]

Williamson

[11] Patent Number: 4,458,926
[45] Date of Patent: Jul. 10, 1984

[54] HYDRAULIC HOSE ADAPTER WITH O-RING SEAL

[76] Inventor: Nigel D. L. Williamson, 4208 Clubview Dr., Fort Wayne, Ind. 46860

[21] Appl. No.: 493,222

[22] Filed: May 10, 1983

[51] Int. Cl.³ .......................... F16L 25/00; F16L 19/00
[52] U.S. Cl. .................................. 285/332.3; 285/354
[58] Field of Search ..................... 285/332.3, 332.2, 354

[56] References Cited

U.S. PATENT DOCUMENTS

| | | |
|---|---|---|
| 115,917 | 6/1871 | Wharton . |
| 322,286 | 7/1885 | Hemje ........................ 285/332.3 X |
| 494,801 | 4/1893 | Weber . |
| 820,437 | 5/1906 | Pehrson . |
| 959,960 | 5/1910 | Oleson . |
| 1,191,503 | 7/1916 | Ford . |
| 1,301,245 | 4/1919 | Fox . |
| 1,563,836 | 12/1925 | Copp ........................... 285/332.3 X |
| 1,800,753 | 7/1929 | Replogle . |
| 1,936,552 | 11/1933 | Goss . |
| 2,025,382 | 12/1935 | Fletcher et al. ....................... 285/86 |
| 2,284,216 | 6/1941 | Kunkel ................................ 285/122 |
| 2,381,829 | 8/1945 | Livers .............................. 285/332.3 |
| 2,453,813 | 11/1948 | Prince ........................ 285/332.3 X |
| 2,458,817 | 1/1949 | Wolfram .............................. 285/120 |
| 2,560,263 | 7/1951 | Wiegand et al. ...................... 285/95 |
| 2,730,380 | 1/1956 | Espy et al. ............................ 284/19 |
| 2,775,471 | 12/1956 | Douglass ......................... 285/332.3 |
| 2,926,027 | 2/1960 | Marquis, Jr. .......................... 285/32 |
| 2,946,606 | 7/1960 | Smith ............................... 285/332.3 |
| 3,058,761 | 7/1958 | Christophersen ................... 285/281 |
| 3,258,279 | 6/1966 | Johnsen . |
| 3,273,917 | 9/1966 | Chakroff ...................... 285/332.2 X |
| 3,395,925 | 8/1968 | Dreiding . |
| 3,468,566 | 9/1969 | Nietzel ............................... 285/341 |
| 3,537,731 | 11/1970 | Reddy . |
| 3,615,109 | 10/1971 | Brinda et al. ..................... 285/332.2 |
| 3,695,642 | 10/1972 | De Woody ..................... 285/133 R |
| 3,847,421 | 11/1974 | Eschbough et al. ................ 285/353 |
| 3,940,843 | 3/1976 | Yeager .................................. 29/437 |
| 3,984,133 | 10/1976 | Bird ............................. 285/332.3 X |
| 3,997,193 | 12/1976 | Tsuda et al. ........................... 285/47 |
| 4,135,742 | 1/1979 | Anderson ............................. 285/87 |

FOREIGN PATENT DOCUMENTS

| | | | |
|---|---|---|---|
| 1086073 | 2/1955 | France ............................. 285/332.3 |
| 204900 | 10/1923 | United Kingdom ............. 285/332.3 |

Primary Examiner—Richard J. Scanlan, Jr.
Attorney, Agent, or Firm—Stevens, Davis, Miller & Mosher

[57] ABSTRACT

A hose coupling is provided with metallic male and female members which are engaged by means of an internally threaded sleeve which is rotatably secured to the female member. The male and female members are provided with tapered male and female seating surfaces. The male seating surface is interrupted by a circumferential groove cut perpendicular to the axis of the bore of the male member. A deformable O-ring is carried in the groove. The cross-sectional area of the groove is greater than that of the O-ring.

18 Claims, 4 Drawing Figures

HYDRAULIC HOSE ADAPTER WITH O-RING SEAL

BACKGROUND OF THE INVENTION

1. Field of the Invention

The present invention relates to adapters for hydraulic hose, particularly those used in high pressure environments such as argricultural and construction equipment. More particularly, the invention is concerned with a hydraulic hose adapter, for attaching a threaded coupling to hose, which uses an O-ring for improving the fluid seal.

2. Description of the Prior Art

Previous hose adapters have used smooth, metal male and female seating surfaces. However, the integrity of these seals can be damaged by mishandling during shipment, which results in blemishes on the smooth metal surfaces, or improper handling during assembly, which may result in foreign matter contaminating one of the surfaces, thus preventing a good seal. Attempting to mount an O-ring in a female member results in difficulties in keeping the O-ring in place prior to and during assembly, and also inconvenience when the O-ring becomes worn and has to be replaced.

O-ring fittings generally are made on a screw machine. The female member is formed using a tool slide, which works in an axial direction. This has been inefficient since tolerance variations are present, resulting either in unsatisfactorily long production time or unsatisfactory amounts of waste.

SUMMARY OF THE INVENTION

It is an object of this invention to provide a hydraulic hose adapter which will have good sealing characteristics, even after mishandling during shipment and assembly.

It is a further object of this invention to provide a hose adapter which may be used with the standard hose couplings.

It is a still further object of this invention to provide a hose adapter having an O-ring for improved sealing, which can be easily replaced when it becomes worn.

It is a still further object of this invention to provide a hose adapter and coupling of simple and economical construction.

The above objects and others are obtained by providing a hose coupling including centrally bored male and female members and an internally threaded sleeve which engages the male member and is rotatably secured to the female member. The male and female members are provided with smooth, frusto-conical, metal male and female seating surfaces. The male seating surface is interrupted by a groove, which extends perpendicular to the axis of the central bore. An O-ring is carried in the groove. The cross-sectional area of the groove is somewhat greater than that of the O-ring. The O-ring is made of a deformable but non-compressible material. The groove is positioned so that the female seating surface contacts the male seating surface on each side of the groove.

DETAILED DESCRIPTION OF THE INVENTION

Figure 1:
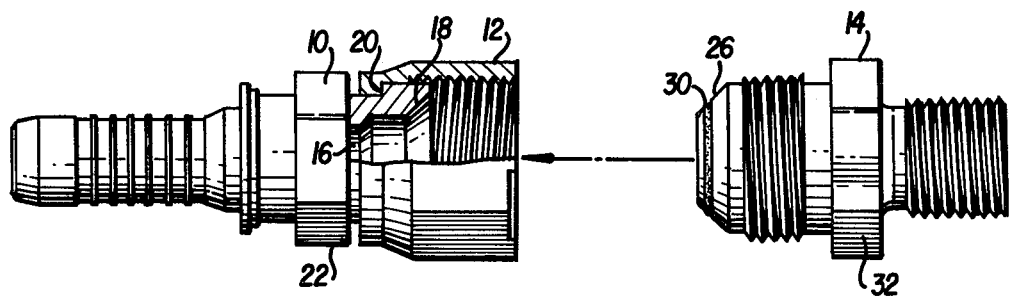
FIG. 1 is a partially sectional side view of the coupling in partially assembled condition.
Figure 2:
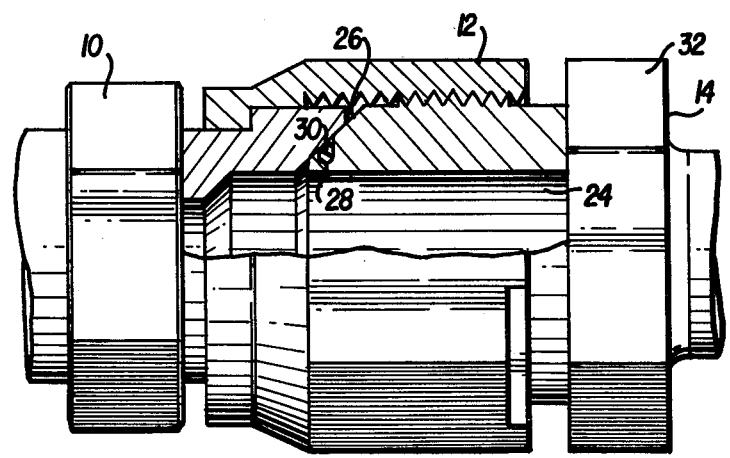
FIG. 2 is an enlarged partially sectional side view of the coupling of FIG. 1, after assembly.

Referring to the drawings, and particularly FIGS. 1 and 2, the hydraulic hose adapter includes a female member 10, an internally threaded sleeve 12 and a male member 14. The female member preferably is a standard female member and part of a coupling known in the art as a J.I.C., 37° Flare or S.A.E. 45° Flare coupling.

The female member is provided with a central bore 16. A smooth, female mating surface 18 is provided which is cut at an angle to the bore 16. The sleeve 12 cooperates with land 20 so that the sleeve is secured to the female member, but is rotatable with respect to the female member. This may be accomplished through crimping, as is well known in the art. The female member may be provided with a hex head 22 to allow wrench tightening.

The male member 14 has external threads which cooperate with the internal threads of the sleeve 12. Like the female member, the male member is provided with a bore 24. The bores of the male and female members are coaxial. A smooth male seating surface 26 is provided on the male member. This seating surface is cut at an angle to the bore, which is the same as the angle of the female mating surface. The angle is usually about 37°, although a 45° angle is not uncommon. The male seating surface is interrupted by an annular groove 28. The seating surface extends on both sides of the groove. An O-ring 30, made of a deformable but non-compressible material, such as a natural or synthetic rubber, is situated in the groove. The choice of material will depend upon the conditions of use. A hex head 32 is provided on the male member to allow wrench tightening. It is preferred that the male member also be from a standard J.I.C. or S.A.E. 45° Flare coupling, except modified to include groove 28.

Figure 3:
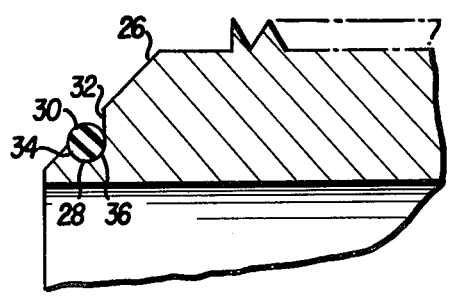
FIG. 3 is an enlarged cross-sectional side view of the sealing portion of the coupling of FIG. 1.
Figure 4:
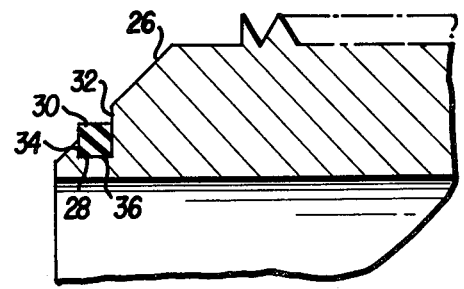
FIG. 4 is a view similar to FIG. 3 of another embodiment of the coupling.

The seal between the male and female members will now be described, with reference to FIGS. 3 and 4. The groove 28 is cut substantially perpendicular to the axis of the male member. This groove can be cut at the same time the tapered seating surface is cut, by slightly modifying the cutting tool. This can be done on a screw machine by using a "cross slide", which works in a radial direction and produces superior time and waste properties over the "tool slide" approach. Since the seating surface is not perpendicular to the direction in which the groove is cut, the groove is provided with a "high" side 32 and a "low" side 34. Preferably, the bottom 36 of the groove conforms to the cross-sectional shape of the O-ring. The O-ring should have a thickness which is greater than the height of the low side of the groove. If the O-ring's thickness is not greater than the height of the low side of the groove, the O-ring will not be deformed when the male seating surface is tightened into the female seating surface. The lack of deformation would decrease the efficiency of the seal. However, the cross-sectional area of the groove must be at least as large as the cross-sectional area of the O-ring, about 100–125% of the O-ring cross-sectional area, more preferably 100–110%, and most preferably about 105%. This allows the O-ring to be deformed but still remain in the groove. If the cross-sectional area of the O-ring were greater than that of the groove, when the male and female members are tightened together, the O-ring will be forced partly out of the groove, since it is made of a deformable, but non-compressible, material. This would decrease the integrity of the seal between the male and female members by preventing metal-to-metal contact adjacent the groove.

To achieve the most effective sealing, it would be desirable to choose an O-ring having a large surface area, and thus a large thickness. However, this would require a groove of a corresponding size. The size of the groove is limited by the structural strength of the metal of the male member. That is, the thickness of the metal between the groove and the bore must be sufficient so that no deformation occurs when the male member is tightened against the female member. For similar reasons, the male and female members are provided with butt ends rather than feathered ends.

The deforming force exerted upon the O-ring is at an angle between the axis of the bore and the perpendicular to the seating surfaces, the resultant of two forces which are present. The force applied by the mating of the seating surfaces of course is perpendicular to the seating surfaces. However, since the male member moves linearly into the female member, there is also a force along the line of movement, i.e., the axis of the bore. This works advantageously with the groove which is cut perpendicular to the bore axis, since the space available for the deformation of the O-ring (the vicinity of the "high" side of the groove) is substantially in line with the direction of the force exerted on the O-ring. Thus, the groove may be deformed to provide a good seal, without danger of the O-ring being forced out of the groove. It has been found that the "substantially perpendicular" groove works well with the presently used common seating angles, for the reasons outlined above. However, the angle need not be exactly perpendicular, and the most desirable angle of the groove may change as the seating angle changes.

The groove should be located so that, upon assembly, the female seating surface contacts the male seating surface on each side of the groove. This provides metal-to-metal sealing on each side of the groove as well as the sealing provided by the O-ring.

It is not necessary that the O-ring have a circular cross-sectional shape. For example, a square cross-sectional shape may be desirable since O-rings having this cross-sectional shape may be formed by slicing a tube, rather than the individual molding required for O-rings of circular cross-section. In such a case, the groove would be provided with a flat bottom (to correspond to the shape of the O-ring). The thickness of the O-ring would still have to be greater than the depth of the groove at the "low" side 34, again so that deformation of the O-ring will occur. Although metal couplings have been described, it is contemplated that other materials, such as high strength resins, could be used in various applications instead of metal.

Couplings with 37° seating surfaces having the following dimensions (in inches, with tolerances) have been produced.

Dimension A—Length of the male member (excluding hexagon)
Dimension B—Length of the female member (excluding hexagon)
Dimension C—Length of the sleeve (threaded nut)
Dimension D—Axial length of the male seating surface
Dimension E—Axial length of the female seating surface
Dimension F—Width of the groove
Dimension G—Axial distance from the end of the male seating surface to the center of the groove
Dimension H—Thickness of the male member at the "high" side of the groove (per side)
Dimension I—Thickness of the male member at the "low" side of the groove (per side)
Dimension J—Thickness of the male member at the center of the groove (per side)
Dimension K—Cross-sectional diameter of the O-ring
Dimension L—Axial length of the overlap between the male and female seating surfaces when assembled

| Dimension | SAMPLE | | | | | |
|---|---|---|---|---|---|---|
| | 7/16" × 20  1 | ½" × 20  2 | 9/16" × 18  3 | ⅝" × 16  4 | ¾" × 14  5 | 1 1/16" × 12  6 |
| A | .550" | .550" | .556" | .657" | .758" | .864" |
| B | .264" | .353" | .353" | .468" | .495" | .510" |
| C | .583" | .703" | .703" | .859" | .969" | 1.030" |
| D | .112" | .113" | .104" | .150" | .153" | .181" |
| E | .091" | .075" | .078" | .090" | .094" | .123" |
| F | .040" | .040" | .040" | .040" | .050" | .070" |
| G | .040" | .040" | .040" | .040" | .050" | .070" |
| H | .078" | .078" | .078" | .078" | .094" | .118" |
| I | .050" | .050" | .050" | .050" | .057" | .067" |
| J | .025" | .025" | .025" | .025" | .025" | .025" |
| K | .040" | .040" | .040" | .040" | .050" | .070" |
| L | .071" | .071" | .078" | .089" | .094" | .123" |

| Dimension | SAMPLE | | | |
|---|---|---|---|---|
| | 1 3/16" × 12  7 | 1 5/16" × 12  8 | 1⅜" × 12  9 | 1⅞" × 12  10 |
| A | .890" | .911" | .958" | 1.083" |
| B | .649" | .650" | .650" | .695" |
| C | 1.187" | 1.203" | 1.238" | 1.384" |
| D | .183" | .182" | .234" | .244" |
| E | .125" | .163" | .220" | .162" |
| F | .070" | .070" | .070" | .070" |
| G | .070" | .070" | .100" | .100" |
| H | .167" | .145" | .146" | .167" |
| I | .115" | .093" | .094" | .115" |
| J | .075" | .052" | .053" | .074 |
| K | .070" | .070" | .070" | .070" |
| L | .125" | .125" | .173" | .162" |

Couplings with 45° seating surfaces having the following dimensions (in inches, with tolerances) have been produced. The definitions of the dimensions from above also apply here.

| Dimension | SAMPLE | | | | | |
|---|---|---|---|---|---|---|
| | 7/16" × 20<br>1 | ½" × 20<br>2 | ⅝" × 18<br>3 | ¾" × 16<br>4 | ⅞" × 14<br>5 | 1 1/16 × 14<br>6 |
| A | .500" | .560" | .620" | .750" | .880" | 1.000" |
| B | .264" | .359" | .375" | .468" | .495" | .510" |
| C | .583" | .703" | .768" | .859" | .969" | 1.031" |
| D | .062" | .076" | .110" | .100" | .110" | .110" |
| E | .117" | .110" | .132" | .125" | .126" | .164" |
| F | .040" | .040" | .050" | .050" | .050" | .050" |
| G | .030" | .035" | .050" | .050" | .050" | .050" |
| H | .107" | .087" | .098" | .098" | .097" | .129" |
| I | .070" | .049" | .049" | .050" | .049" | .080" |
| J | .051" | .032" | .025" | .028" | .025" | .055" |
| K | .040" | .040" | .050" | .050" | .050" | .050" |
| L | .062" | .076" | .110" | .100" | .110" | .110" |

In the attached drawing, a full helical thread has been illustrated for convenience. It is contemplated that other types of early disconnected fastening means could also be used, such as a bayonet or quarter-twist interlock or clamp-type filling. In fact, it is contemplated that the greater sealing efficiency of the present fitting may make it possible to use a less expensive or easier to manufacture fitting than in the prior art.

Although a detailed description and a specific example of the present invention have been provided above, the present invention is not limited thereto. Modifications will be apparent to those of ordinary skill in the art which remain in the spirit and scope of the present invention, which is defined by the following claims.

I claim:

1. A house coupling, comprising:
   a female member having a central bore and a frustoconical female seating surface;
   an internally threaded sleeve rotatably secured to said female member; and
   an externally threaded male member with threads engaging the threads of said sleeve, having a central bore coaxial with the bore of said female member, a frustoconical male seating surface complementary to said female seating surface, an annular groove in said male seating surface directed substantially perpendicular to the axis of said bore with one side of the groove having a greater depth than the other side, an O-ring of deformable and non-compressible material in said groove, the cross-sectional area of said groove being larger than that of said O-ring, said O-ring having a cross-sectional height which is greater than the minimum depth of said groove and extending beyond an imaginary frustoconical surface connecting the minimum and greater depth sides of the groove when undeformed, said O-ring having a size and shape with respect to the size and shape of the groove such that the O-ring is deformed towards the greater depth side of the groove by said female seating surface, said groove being positioned so that said female seating surface sealingly contacts said male seating surface on each side of said groove with no portion of the O-ring being between said male and female surfaces, said male member having a thickness between said central bore and the bottom of said groove sufficient to withstand the pressure exerted through said O-ring without deformation of the male member.

2. A hose coupling as claimed in claim 1, wherein the cross-sectional area of said groove is less than or equal to 110% of that of said O-ring.

3. A hose coupling as claimed in claim 2, wherein the cross-sectional area of said groove is about 105% of that of said O-ring.

4. A hose coupling as claimed in claim 1, wherein said O-ring has a circular cross-section.

5. A hose coupling as claimed in claim 4, wherein said groove has a rounded bottom.

6. A hose coupling as claimed in claim 1, wherein the angle of said male and female seating surfaces is about 37°.

7. A hose coupling as claimed in claim 1, wherein said angle of said male and female seating surfaces is about 45°.

8. A hose coupling as claimed in claim 1, wherein said female member is a female member from a standard J.I.C. or S.A.E. 45° Flare coupling.

9. A hose coupling as claimed in claim 8, wherein said male member is a male member from a standard J.I.C. or S.A.E. 45° Flare coupling, modified by having said groove cut in its male seating surface.

10. A hose coupling as claimed in claim 1, wherein said O-ring has a square cross-section.

11. A hose coupling as claimed in claim 10, wherein said groove has a flat bottom.

12. A male member for attachment to an end of a hose or pipe, comprising:
    an elongated body having a central longitudinal bore and means for attachment to said hose or pipe;
    a smooth frustoconical male seating surface at the distal end of said body, said surface having an inner edge adjacent said bore and an outer edge;
    a circular groove on said seating surface spaced between said inner and outer edges so that a portion of the seating surface exists on both sides of said groove; the central axis of said groove being substantially perpendicular to the axis of said bore so that the groove has a low sidewall adjacent said inner edge defining the minimum depth of the groove and a high sidewall spaced therefrom defining the maximum depth of the groove;
    an O-ring of deformable, substantially non-compressible material positioned in said groove; the radial cross-sectional height and volume of the O-ring in relationship to the minimum depth and volume of the groove being such that the outer diameter of the O-ring is larger than the minimum depth of the groove, the O-ring extends beyond an imaginary frustoconical surface connecting the low and high sidewalls of the groove when undeformed, and the volume of the groove is large than the volume of the O-ring so that upon tightening of the seating surface against a complementary frustoconical surface, there will be a surface-to-surface sealing contact on both sides of the groove, with the O-ring deformed into the groove only and against the high sidewall thereof.

13. The male member of claim 12, wherein said male member is a male member for a hydraulic hose coupling.

14. The male member of claim 13, wherein said male member is a standard J.I.C. or S.A.E. 45° male member, modified by having said groove cut in its male seating surface.

15. The male member of claim 14, wherein said male member is a standard J.I.C. male member, modified by having said groove cut in its male seating surface.

16. The male member of claim 12, wherein the radially inner portion of the O-ring has a size and shape corresponding to that of the bottom of the groove.

17. A hose coupling, comprising:
a female member having a central bore and a frustoconical female seating surface;
an internally threaded sleeve rotatably secured to said female member; and
an externally threaded male member with threads engaging the threads of said sleeve, having a central bore coaxial with the bore of said female member, a frustoconical male seating surface complementary to said female seating surface, an annular groove in said male seating surface directed substantially perpendicular to the axis of said bore with one side of the groove having a greater depth than the other side, an O-ring of deformable and non-compressible material in said groove, the cross-sectional area of said groove being greater than 100% and less than or equal to about 125% of that of said O-ring, said O-ring having a cross-sectional height which is greater than the minimum depth of said groove and extending beyond an imaginary frustoconical surface connecting the minimum and greater depth sides of the groove when undeformed, said O-ring having a size and shape with respect to the size and shape of the groove such that the O-ring is deformed towards the greater depth side of the groove by said female seating surface, said groove being positioned so that said female seating surface sealingly contacts said male seating surface on each side of said groove with no portion of the O-ring being between said male and female surfaces, said male member having a thickness between said central bore and the bottom of said groove sufficient to withstand the pressure exerted through said O-ring without deformation of the male member.

18. A hose coupling, comprising:
a female member having a central bore and a frustoconical female seating surface;
an internally threaded sleeve rotatably secured to said female member; and
an externally threaded male member with threads engaging the threads of said sleeve, having a central bore coaxial with the bore of said female member, a frustoconical male seating surface complementary to said female seating surface, an annular groove in said male seating surface directed substantially perpendicular to the axis of said bore with one side of the groove having a greater depth than the other side, an O-ring of deformable and non-compressible material in said groove, the cross-sectional area of said groove being greater than 100% and less than or equal to about 125% of that of said O-ring, said O-ring having a cross-sectional height which is greater than the minimum depth of said groove and extending beyond an imaginary frustoconical surface connecting the minimum and greater depth sides of the groove when undeformed, the radially inner portion of said O-ring having a shape and size corresponding to the shape and size of the bottom of the groove, said O-ring being deformed towards the greater depth side of the groove by the female seating surface, said groove being positioned so that said female seating surface sealingly contacts said male seating surface on each side of said groove with no portion of the O-ring being between said male and female surfaces, said male member having a thickness between said central bore and the bottom of said groove sufficient to withstand the pressure exerted through said O-ring without deformation of the male member.

* * * * *